Jan. 16, 1940. W. A. BOUGHTON ET AL 2,186,954
ART OF MANUFACTURING HIGH TEMPERATURE MICA PRODUCTS
Filed Oct. 29, 1935
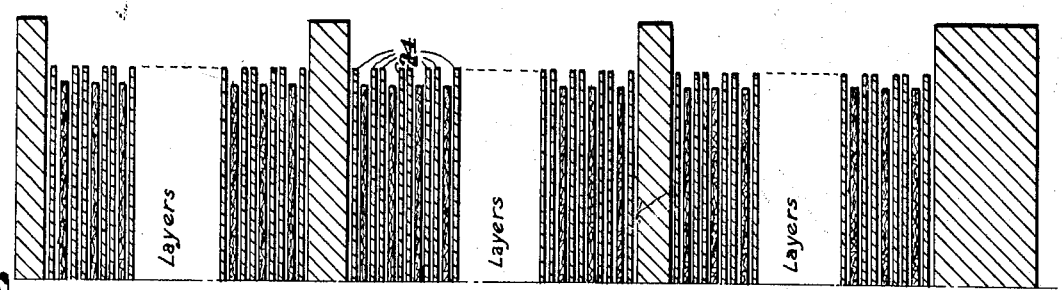
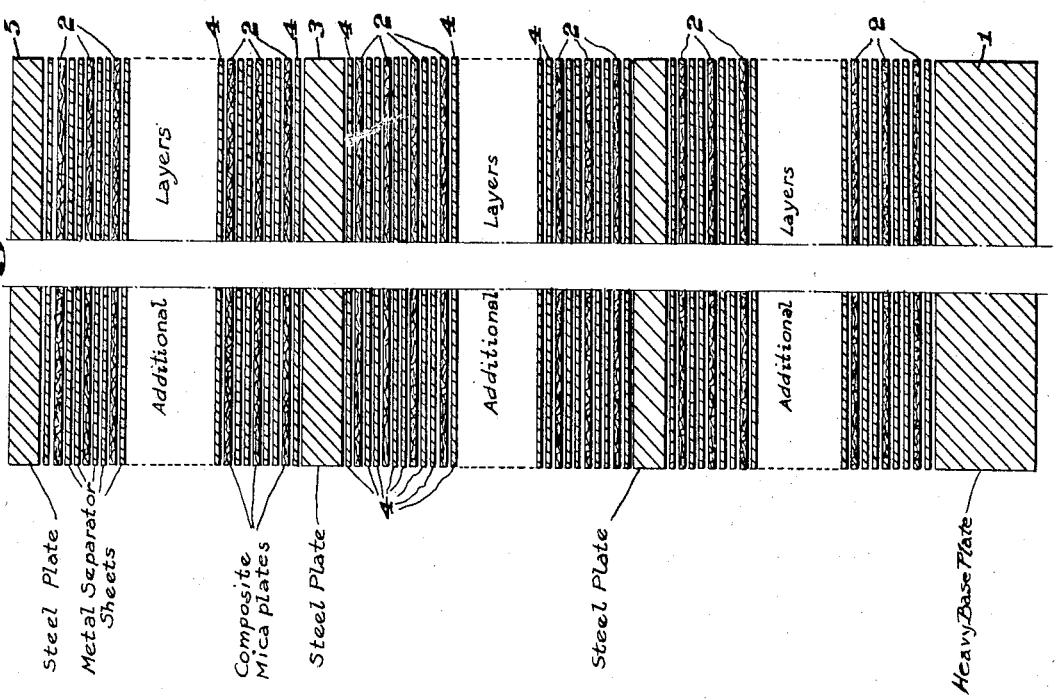
INVENTORS
Willis A. Boughton
William R. Mansfield
BY Warren G. Ogden
ATTORNEY Patented Jan. 16, 1940

2,186,954

UNITED STATES PATENT OFFICE 2,186,954

ART OF MANUFACTURING HIGH TEMPERATURE MICA PRODUCTS

Willis A. Boughton, Cambridge, and William R. Mansfield, Boston, Mass., assignors, by mesne assignments, to New England Mica Company, Waltham, Mass., a corporation of Massachusetts Application October 29, 1935, Serial No. 47,262

30 Claims. (Cl. 154—2.6)

This invention relates to improvements in the art of manufacturing high temperature built-up, laminated or composite mica products, for example, mica plate and various shaped mica articles, and to the products produced by the process or processes.

The inventions described herein are, in general, improvements over those described in United States Patent No. 1,578,812, dated March 30, 1926, to Chester L. Dawes and Willis A. Boughton.

More particularly the inventions described herein relate to an improved inorganic binder for mica plate and other built-up mica products and to an improved process of manufacturing high temperature mica plate including a novel method of building and handling the green plate and its treatment. The new products of this invention have exceptional value in markedly higher electrical insulation resistance, integration and translucency, and in greater strength and uniformity over all previous high heat composite mica products. Their superiority in these qualities is so marked that they have displaced natural mica for many uses where natural mica was heretofore thought to be the only suitable material.

The general object of this invention is to produce composite mica plate and products formed therefrom capable of withstanding, without change, high temperatures up to the temperature of disintegration of the mica.

To the accomplishment of this object and such others as may hereinafter appear, as will readily be understood by those skilled in the art, the invention comprises the features, combinations and processes of manufacture hereinafter described and then particularly pointed out in the appended claims.

The nature and scope of the invention will be understood from the following description of the new composition of the inorganic binder material, the preferred characteristics of the mica plate bound thereby, and the novel processes employed in the manufacture of the plate, aided by reference to the accompanying drawing, in which:

Figure 1 shows a charge, in transverse section, of unbaked and uncompressed, but partially dried mica plate, ready for introduction into, or as within, a suitable furnace, each mica plate being separated from the other by metallic sheets of substantially the size of the mica plate; and Fig. 2 is a view similar to Fig. 1 except that the separator sheets have an area somewhat larger than the area of the mica plate thereby separated.

In both figures of the drawing the layers of the heater charge formed by the mica plates and their separator sheets and heavier end plates are shown as expanded for ease of explanation, it being understood that in practice adjacent layers are in contact.

At least one of the formulas described in said Patent 1,578,812 has been in constant use until recently, when research was instituted to obtain mica products of improved properties by alteration of the original processes and formulas in various ways. The results of the research have been so successful that mica products as made in accordance with this invention, particularly built-up mica plate, show markedly higher electrical insulation resistance, integration and translucency; and are stronger and more uniform than any previously made. As one example of improvement typical composite plate of 0.015 inch thick made under the teaching of said patent show a dielectric strength of about 880 volts per mil., while typical composite plate of the same thickness made by the novel processes described herein show a dielectric strength of about 1240 volts per mil. This remarkable increase in electrical insulation resistance together with the additional improved characteristics and qualities of the plate permits this new plate and mica products manufactured therefrom to enter into direct and successful competition with natural mica for a rapidly increasing number of uses, particularly where plate areas greater than can be obtained from the natural mica are requisite. The various changes over prior practice responsible for the improved mica products are described hereafter.

1. Composition of the binder material

The formula, given in page 5, lines 82–83 of the above cited Patent 1,578,812, was used most regularly in later years. Recent research work, however, has shown that a change in the ratio of borax to monobasic sodium phosphate, in conjunction with other changes described hereafter, yields products of greater translucency, more complete integration, higher electrical insulation resistance, and enhances other desirable properties. The proportions compared are as follows:

|  | Patent 1,578,812 | Present invention |
|---|---|---|
|  | Parts by weight | Parts by weight |
| Monosodium phosphate | About 3 | About 1. |
| Borax | About 6 | About 4 to 6. |
| Water | About 22 | About 14 to 16. |

As compared with the formula in the patent, the new bonding composition is considerably more concentrated with regard to borax, containing about eighty to eighty-six percent as compared to about sixty-six and six-tenths percent, on a dry basis. Furthermore, the solution is somewhat less concentrated. When, as is sometimes the case, it is desirable to produce mica products having a greater electrical resistivity than those produced by the original process, without sacrificing essential mechanical strength, this may be accomplished by a still greater dilution of the binder, using about twenty parts of water. With the normal and diluted formulas the decrease in percentage of solids in the primary solution results in a somewhat lower percentage of binder in the finished product, (about four percent as compared with about six percent in the old product), and is undoubtedly in part responsible for the improvement observed when the new formula is used, because of the more effective spread of the fluid. This change in proportions, though apparently small, has produced most significant results.

It must be recognized that this effect could not be predicted. Borax is a less fusible, and more easily crystallizing substance than sodium metaphosphate (the bonding temperature decomposition product of monosodium phosphate). It would normally be expected that any increase in this constituent of a bonding composition would cause an increase in opacity, less complete integration, and resulting decrease in desirable electrical and other properties. But the opposite is the case. Improvement is obtained by employment of increased proportions of borax in this formula. The reason for this appears to be that borax acts partly as a bonding constituent and partly as a crystallization restraining material; (see Patent No. 2,016,274, dated Oct. 8, 1935, Method of restraining crystallization, by W. A. Boughton; and Patent No. 2,113,533, dated April 5, 1938, Restraint of crystallization of inorganic colloids in aqueous association, by W. A. Boughton and W. R. Mansfield). Under pressure, as has been observed in the latter patent, relatively large proportions of certain compatible substances may be incorporated into inorganic bonding compositions to yield bonded products of improved properties.

2. Method of constructing laminated plate

The earlier practice was to apply the inorganic binder liquid to mica films of moderate size exactly as when an organic bonded plate is being made. In practicing the earlier method where the films of mica used have generally all been approximately of standard size, it is not possible to prevent some of the bonding substance from exuding to the outer surface of the green plate, unless special precautions are taken to prevent this from happening and even then with only moderate success.

Recent experiments have shown that improvement in the properties of the finished high-heat mica plate is effected by using the following novel method of building up the green plate from mica films.

The operator, in the preferred method of hand building, will use three screens instead of one as for ordinary plate. The new plate will be built in halves on two of the screens and the third is used as a dry support for the combined halves forming the finished plate during the step of superficial dehydration.

One half of the new plate is built by scattering a layer of mica film of standard size, about 1½ x 1½ inches in area, on a screen and covering them with a superficial layer of sprinkled, sprayed or painted binder liquid in controlled quantities. Additional layers of mica films are added with binder liquid between until built up to almost one-half the desired thickness. The full half thickness is attained by layering on with binder liquid one or more layers of extra or oversize mica films, for example No. 4 film, about 3 x 3 inches in area. The top surface of this half plate remains quite dry, the gravitational trend of the binder being away from the lapped oversize surface films. The other half of the plate is built similarly on another screen. One of the halves is then inverted and the other half is lifted and placed on the inverted half with an application of binder liquid between. This gives a combination of which the oversize, dry mica films constitute the top and bottom layers. The completely built green plate is then slid onto the third dry screen which, as stated, supports it for further processing. It is convenient to invert the half plate onto the third screen.

The advantages of this method of layering the mica films will be at once apparent to those skilled in the art. The use of oversize mica films for the outer layers tends to prevent any of the interior binder liquid from seeping through and it is believed this practice is responsible for the dry surface condition obtained and retained. Using the prior practice, smaller size of film at the surface and the ordinary method of building, the operator, regardless of skill, could not prevent the binder from a gravitational penetration to the outer surface. This is true regardless of the kind of binder used so that use of the new method will enhance the value of the electrical properties of composite mica plate for many uses. The new integrated plate made with a high temperature resisting binder shows a marked enhancement of electrical insulation resistance, particularly surface resistivity thus reducing current leakage along the surface. This has resulted in such new plate and products made therefrom successfully entering fields of use that have been closed to high-heat composite mica plate as formerly constructed, for example, when used as insulation in domestic heating appliances its increased surface resistivity has a definite effect in reducing the shock hazard of the appliance.

Elimination of the binder from exterior surfaces affords another advantage in the manufacturing process. The adhesive properties of the fused inorganic binder are so great that the tendency of the mica plate to stick to the metallic sheets separating the plates of the baking charge has been a definite source of trouble. With the new technique of construction the sticking of mica to metal has been eliminated as to any practical disadvantage.

3. Improvements in method of dehydrating and fusing binder and application of pressure The former practice was to place the green, unheated but superficially dehydrated plate (or several of them) between wire screening and thin iron sheets of suitable size and heat under pressure in a directly electrified type of press until fusion of the inorganic binder mixture took place. The use of screens produced an irregularly marked surface that is undesirable, and the fused plate occasionally became cracked or wrinkled during cooling because of the unequal coefficients of expansion of the mica plate and the adjacent metal. Furthermore, the employment of direct electrical heating had the disadvantage of producing plates in which the binder was less fused at the edges than in the center, yielding a product of uneven properties.

Our research finally showed that definite improvement in the properties of the finished plate could be obtained by using the following method in the application of heat and pressure. It should be distinctly understood that while the basic improvement of the product depends upon the use of all of the new features collectively, nevertheless each in itself is of importance.

The green unheated plate is first superficially dehydrated by heating to about 40° C. in a vacuum oven under about 28 inches of vacuum without application of pressure; or with less efficiency, the green plate may be so dehydrated in a steam heated oven at atmospheric pressure. The point to bear in mind is that the degree of vacuum and the heat treatment must be so related as to liberate the solvent in such a gentle way that the structure of the composite mica plate remains unchanged at the end of this stage of its treatment. Obviously the water solvent must not be permitted to boil. In the broader aspects of the invention the criterion must be observed of a temperature no higher than is required by the partial vacuum chosen for liberating the solvent as a vapor. We have selected about 28 inches of vacuum as efficient and apply about 40° C. because that temperature will vaporize the water at the chosen atmospheric condition. Obviously this is but one application of the criterion to be observed and, of course, the temperature must be correspondingly elevated as a change of the vacuum approaches atmospheric pressure. This treatment effects a partial adhesion of the mica films while avoiding puffing or disturbance of their pattern of assembly such as occurs when, according to earlier practice, the green plate was dehydrated by rolling on a steam table. Preliminary heating without rolling also keeps the binder from working out onto the outside layers which, for the reasons stated, are best kept free from binder.

The green plate thus composed is then heated with others of similar construction, the several plates of the charge being separated from one another by thin metallic separator sheets having a desirable negligible thermal coefficient of expansion as now to be described.

The superficially dehydrated green plate is built up into baking charges of suitable height preferably using the following alternation of mica plate and metallic separator sheets.

Referring first to Fig. 1 of the drawing, at the bottom of the charge is a thick metallic base plate 1 which may be about 1¾ inches thick. Upon this base plate are two or more courses of the green mica plate 2 (in practice we may use up to about fifty, or more, of such plates in a course) each plate preferably being engaged above and below by a full sized special separator sheet 4 of thin metal, further described hereafter. Thus between adjacent plates 2 there are two of the metallic separators 4. This course or assembly of layered mica plates and separator sheets is covered by a thinner metallic plate 3 which may be about ¾ of an inch thick. Upon the plate 3 there is placed a similar course or assembly of mica plates and metallic separator sheets as described above. The piling up of such courses is continued until the desired height is reached when a metallic top plate 5 which may be about ⅝ of an inch thick is added. Up to 1¼ inch thickness has been used. A function of the thinner plates 3 is to prevent displacement of the mica films and also to prevent warping of the mica plates during the baking operation.

The only difference between Figs. 1 and 2 is that while in Fig. 1 the metallic separator sheets and warp preventing plates are shown as of approximately the same size as the interleaved mica plates to be baked, in Fig. 2 the metallic separator sheets 24 and the warp preventing plates 23 are both shown as of a somewhat larger size than the mica plates 22 so as to present uncovered edges which serve to absorb heat from the furnace and thus aid in transferring heat to the binder. Obviously it is not essential that the plates 23 be oversized since the main source of heat transfer thus enhanced comes from the sheets 24 contacting the mica plates.

The charge is now placed in a suitable furnace which is then closed and heat applied, without the addition of further pressure on the plate than that of the one or two pounds per square inch due to the weight of the material forming the charge, until a binder fusion temperature of red heat is reached, for example about 550° C. to about 650° C. for the inorganic binder specifically described herein. The charge, while still red hot with the binder in a molten vitreous state, is drawn into an hydraulic or other suitable press and immediately a pressure of from about 250 to about 500 lbs. per square inch is applied. The absence of applied pressure before the charge is thoroughly heated to the desired temperatures of redness permits a more complete dehydration and a freer melting of the binder. In this condition the application of high pressure produces a more uniform distribution and more perfect transformation of the binder to a clear, translucent vitreous adhesive. On the other hand, in the former method when pressure was applied to the mica plate during heating, fusion commenced as soon as temperatures of red heat were attained and progressed as the temperature was raised, but there was necessarily incomplete dehydration, in adequate flowing and distribution, and consequent opacity and imperfect fusion of the binder.

Under the present method, where definite compression is not applied to the charge until after fusion of the binder, the compression causes the molten glass-like binder to flow evenly into all interstices between the mica films and thus to bond the films of each individual plate into an integral product. Upon reaching this stage of the process the entire charge may be cooled conveniently by water cooled platens at the top and bottom of the press and by air blasts. In the earlier process using the binder formula of said Patent 1,578,812 the maximum pressure employed was about 250 lbs. per square inch.

The advantage of using two separator sheets between adjacent mica plates of the charge principally accrues at the time of dissembling the charge of finished plate. Under the best of conditions there is some superficial, but not deleterious, sticking of the mica to the contacting metal. By separating the mica plates with pairs of metallic sheets the operator may individually remove each finished mica plate with its encasing separator sheets. Stripping from the metal, if required, is then more easily effected than when the mica plates must be successively stripped from the pile. In general, placing the mica plate between two separator sheets permits easier handling during both assembly and disassembly of the charge.

The particular method of stacking the green mica plates, separator sheets and warp-preventing plates permits the mica plate to be heated rapidly and uniformly throughout. An application of additional pressure over the relatively low pressure resulting from the mere weight of the pile is not necessary during heating, and it is desirable not to have it greater in order that under the application of heat the fusing binder is not forced out of position. Furthermore, heating in the absence of a relatively high applied pressure permits more complete dehydration and more uniform melting of the binder. When the charge is being subsequently cooled in the press the flow of heat is from the interior of the mass outward, so that the binder is less fluid at the edges of the mica plates than at their centers. Consequently when in the press, and while the hot pile is under compression, there is less tendency for the binder to be squeezed out, being retained by the greater viscosity of said binder at the cooler edges. The pressure operates thus better to obtain a high degree of integration.

The nature of the metal used for the separator sheets is of importance. For the type of binder herein described it should have a low or negligible thermal coefficient of expansion at all temperatures, that is, of the same order as that of the mica plate between the separators, for example, a metal of the Invar type. In practice we have found that an alloy containing about 54 percent of iron, and about 46 percent of nickel to be satisfactory. We have used a metal offered to the trade under the name of "Allegheny electric metal", (stated to be an alloy of 53% iron and 47% nickel) the thermal coefficient of expansion of which is close to zero and very close to that of our mica plate as shown by the following table:

*Temperature coefficients of expansion per degree*

| Temp. | Allegheny Electric Metal manufacturers data | Our high temperature plate as measured |
|---|---|---|
| 212° F | $5.55 \times 10^{-6}$ | $5.73 \times 10^{-6}$ |
| 752° F | $5.66 \times 10^{-6}$ | $6.56 \times 10^{-6}$ |

Doubtless there are other alloys commercially available that could be used as successfully. The criterion of approximate equivalence of the thermal coefficients of expansion of the mica plate and the separator sheets during both heating and cooling operations should be observed, however.

Formerly a direct heating electric oven was used for fusing the binder. Recent work has shown that the use of a fuel or electric furnace or heater in which the charge is indirectly heated offers many advantages over the former direct heating method. In the earlier direct heating method the fusing binder was surrounded by a highly oxidizing atmosphere which was detrimental for the reason that the binder opacified and crystallized, did not flow properly and exhibited inferior adhesive qualities. In our new method, using an indirect heating furnace in which but a slight excess of oxygen may be present, the environmental atmosphere may be maintained substantially neutral under which condition practice has determined that the binder is caused to flow evenly, without opacification or edge crystallization, to a clear vitreous form possessing marked adhesiveness. It has been determined that such an atmosphere is highly beneficial. It aids definitely in the production of clear and uncrystallized products. Furthermore, the nature of the environmental atmosphere and the zones of combustion can easily be controlled to gain the best advantage when indirect heating is used.

Those skilled in the art will recognize from the foregoing description of our invention that the process of manufacture may be carried on continuously on a line controlled basis.

The products produced by the processes described herein have been found to be superior in all respects to any built-up or composite high temperature mica products heretofore produced by any process known to us.

In the foregoing description and in the following claims, the mica plate is described as being subjected to a binder "fusion" temperature and the binder is described as being "fused" by the applied heat. It should be understood that these and other like terms relating to the heat treatment step of the process refer to the change effected in the condition of the binder, i. e. a fluxing of the binder to bring it to a state of fluidity or liquification to attain its maximum available adhesiveness, and do not refer to the fusion, or increased flowing and resulting distribution, of the binder produced by the application of pressure to the binder while in a state of flux.

What is claimed as new, is:

1. The method of making high-heat composite mica products which comprises building up mica films into a plate by cementing a plurality of layers of said films together with a high temperature resisting inorganic binder, said binder applied as a liquid, removing solvent from said binder within the plate, assembling a plurality of the superficially dried mica plates into a pile with the plates separated from each other by metallic sheets having a low or negligible thermal coefficient of expansion, baking said pile in a furnace at a binder fusion temperature of from about 550° C. to about 650° C., compressing said pile while still hot under a pressure of from about 250 to about 500 lbs. per square inch, and cooling said pile while still under pressure.

2. The method of making high-heat composite mica products which comprises constructing a plate from a plurality of layers of mica films cemented together with a high temperature resisting inorganic binder, superficially dehydrating the binder in said plate, piling a plurality of said plates so treated to form a furnace charge each plate being separated from the other by at least one metallic sheet, baking said charge in a furnace at a temperature that will fuse the binder, transferring said hot charge of mica plate and separator sheets to a press and compressing it under a definite effective pressure while still hot, and permitting said mica plates to cool while still under compression.

3. The method according to claim 2 in which said binder fusion temperature is from about 550° C. to 650° C.

4. The method according to claim 2 in which said hot charge is compressed under a pressure of about 250 lbs. per square inch and upward.

5. The method according to claim 2 in which said hot charge is compressed under a pressure ranging from about 250 to about 500 lbs. per square inch.

6. The method in accordance with claim 2 in which the baking operation on the furnace charge is conducted in an environmental atmosphere beneficial to substantially complete dehydration and free melting of the inorganic binder.

7. The method in accordance with claim 2 in which the baking operation on the furnace charge is conducted in a substantially neutral environmental atmosphere within an indirect heating furnace.

8. The method in accordance with claim 2 in which the solvent is removed from the binder while under reduced atmospheric pressure and at a temperature at substantially the vaporization point of the solvent at such reduced pressure.

9. The method in accordance with claim 2 in which said separator sheets are characterized by a negligible thermal coefficient of expansion.

10. The method in accordance with claim 2 in which said separator sheets are characterized by a thermal coefficient of expansion of the same order as that of the inorganic bonded mica plate.

11. The method in accordance with claim 2 in which the separator sheets are made of a metal alloy having the general expansion characteristics of Invar metal.

12. The method in accordance with claim 2 in which the separator sheets are made of a metal alloy containing about 54% of iron and about 46% of nickel.

13. The method in accordance with claim 2 in which the mica plates forming the charge are separated by two metallic separator sheets during the baking and subsequent cooling.

14. The method in accordance with claim 2 in which the charge of mica plates is baked while substantially free from superimposed pressure.

15. The method in accordance with claim 2 in which the binder consists of an aqueous liquid comprising about one part of monosodium phosphate, about four to six parts of borax, and from about fourteen parts to about twenty parts of water.

16. In the method of making high-heat composite mica products, the steps of constructing a plurality of composite mica plates bonded by a high temperature resisting inorganic binder, piling said plates into a heater charge, heating the charge red hot, and then transferring said red hot charge to a press and immediately compressing it.

17. In the method as defined by claim 16 heating the charge to red heat while maintaining the mica plates under no pressure other than the dead weight of the built up heater charge.

18. In the method as defined by claim 16 wherein the charge is heated by absorption of heat while substantially free from superimposed pressure.

19. In the method of making high-heat integrated mica plate bonded with a high temperature resisting inorganic binder, the step of heating the plate until the binder reaches a substantially anhydrous molten state while the plate is under pressure of a low order such that the application of heat will not force the fusing binder out of position.

20. In the method of making high-heat integrated mica plate as defined by claim 19 the additional step of subsequently applying such a degree of pressure to the hot substantially dehydrated plate as will uniformly distribute the binder throughout the integrated mica films and will concurrently transform the binder to a clear, translucent vitreous adhesive.

21. The method of making composite mica plate which comprises constructing the plate in halves, each half consisting of a plurality of layers of bonded mica films of ordinary size and one outer face formed of oversize mica films, then bonding together the two halves with the oversize films constituting the top and bottom layers of the completely formed plate.

22. The method of making composite mica plate which comprises spreading mica films of standard size on a screen or the like, applying a binder liquid and continuing in this manner until almost one-half the desired thickness of the plate has been attained, then continuing with oversize mica films layered on with binder until built-up to the desired half-thickness, building another half-thickness plate in a similar manner, inverting one of said half-thickness plates, and bonding said other thereto face to face with the small films all at the interior of the completely built plate.

23. Composite mica products, the mica films of which are bonded together under pressure by the high temperature fusion residue of an aqueous liquid binder consisting of about 1 part of monosodium phosphate, about 4 to 6 parts of borax, and about 14 to 20 parts of water.

24. A composite mica plate having binder-free faces consisting of at least one layer of unusually large area, overlapped mica films on each surface and a plurality of layers of smaller area, overlapped mica films between said surface layers, said interior layers being bonded to each other with a suitable adhesive binder, and said surface layers being bonded, respectively, to the outer faces of the laminated structure formed by said bonded interior layers by binding material confined to the inner faces of the overlapped mica films forming said surface layers by virtue of which the outer faces of the plate are devoid of binding material.

25. The method of making high-heat composite products which comprises constructing a plurality of mica plates from layers of overlapped mica films bonded together by a high temperature resisting inorganic binder in solution, partially removing the solvent by heating the plates while free from superimposed pressure thus maintaining the original pattern and keeping the binder from working to the faces of the plates, piling a selected number of said dry-faced plates into a heater charge, heating said charge under essentially low pressure until the binder is thoroughly fused and has become highly adhesive, transferring the hot charge to a press and compressing it causing the fused binder to spread thoroughly between the mica films and effect complete integration, and retaining the charge under compression while cooling.

26. In the process of making compressed integrated mica plate bonded with a high temperature resisting inorganic binder, first fusing the binder within the plate and bringing it to its state of maximum available adhesiveness before compression, and after said complete fusing of the binder has been accomplished compressing to cause the fused binder to spread throughout the area of the plate, fill interstices and so effect complete integration.

27. In the process of making integrated mica plate from mica films cemented together by an aqueous bonding material, the step of removing from the green product the water solvent of the bonding material while under about 28 inches of vacuum and at a temperature up to about 40° C.

28. In the process of making integrated mica plate from mica films cemented together by an aqueous bonding material, the step of dehydrating the green product by heating said product, while under a predetermined reduced atmospheric pressure, to a temperature no higher than is required by the chosen atmospheric condition for liberating the water solvent of the bonding material gently, as by vaporization, from between the films, thus maintaining the pattern of the assembly of mica films undisturbed by escape of the solvent during the treatment and the integrated structure of the plate at the end of the treatment.

29. A composite mica product composed of a plurality of layers of mica films integrated with a high temperature resisting inorganic binder and characterized by binder-free outside faces, and by a substantially uniform and complete binder fusion and distribution thereby presenting a clear, substantially uniform translucent appearance free from cracks or wrinkles and from opaque or crystalline spots or areas, said product having markedly high electrical insulation resistance, particularly surface resistivity, and a strength and uniformity approaching that of natural mica.

30. An integrated mica plate adapted to withstand high temperature conditions up to the temperature of disintegration of the mica without delamination, consisting of a plurality of layers of mica films having said films bonded together by the confined solidified vitreous residue of a thoroughly fused high temperature resisting inorganic binder, said plate exhibiting a substantially even translucency and having binder-dry outside faces, said characteristics resulting in such a marked enhancement of its electrical insulation resistance and consequent reduction of current leakage along its surface over previous integrated mica plate as to compare favorably with the like qualities of natural mica heretofore selected as the suitable material for withstanding high temperature conditions.

WILLIS A. BOUGHTON.
WILLIAM R. MANSFIELD.